United States Patent
Estipona

(10) Patent No.: US 7,269,842 B1
(45) Date of Patent: Sep. 11, 2007

(54) TIME SHIFTING ENHANCED TELEVISION TRIGGERS

(75) Inventor: Jim B. Estipona, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1132 days.

(21) Appl. No.: 09/652,413

(22) Filed: Aug. 31, 2000

(51) Int. Cl.
H04N 7/173 (2006.01)

(52) U.S. Cl. ............... 725/134; 725/131; 725/132; 725/139; 725/140; 725/142; 725/151; 725/152; 725/32; 725/25; 725/14; 725/9

(58) Field of Classification Search ............ 725/27, 725/28, 29, 52, 54, 58, 136; 707/9–10
See application file for complete search history.

(56) References Cited

U.S. PATENT DOCUMENTS

| | | | |
|---|---|---|---|
| 5,390,027 A * | 2/1995 | Henmi et al. ............... 386/65 |
| 5,818,441 A * | 10/1998 | Throckmorton et al. .... 345/717 |
| 5,937,331 A * | 8/1999 | Kalluri et al. ............. 725/146 |
| 6,061,719 A * | 5/2000 | Bendinelli et al. ......... 709/218 |
| 6,065,050 A * | 5/2000 | DeMoney ................... 709/219 |
| 6,338,094 B1 * | 1/2002 | Scott et al. ................ 709/245 |
| 6,351,467 B1 * | 2/2002 | Dillon ....................... 370/432 |
| 6,415,438 B1 * | 7/2002 | Blackketter et al. ....... 725/136 |
| 6,460,180 B1 * | 10/2002 | Park et al. .................. 725/40 |
| 6,473,137 B1 * | 10/2002 | Godwin et al. ............ 348/725 |
| 6,560,777 B2 * | 5/2003 | Blackketter et al. ....... 725/110 |
| 6,571,392 B1 * | 5/2003 | Zigmond et al. ........... 725/110 |
| 6,574,795 B1 * | 6/2003 | Carr ............................. 725/71 |
| 6,591,420 B1 * | 7/2003 | McPherson et al. ......... 725/29 |
| 6,643,692 B1 * | 11/2003 | Philyaw et al. ............ 709/219 |
| 6,668,378 B2 * | 12/2003 | Leak et al. ................. 725/136 |
| 6,725,461 B1 * | 4/2004 | Dougherty et al. .......... 725/40 |
| 6,766,524 B1 * | 7/2004 | Matheny et al. ............. 725/23 |
| 2002/0010926 A1 * | 1/2002 | Lee .............................. 725/40 |
| 2002/0056129 A1 * | 5/2002 | Blackketter et al. ....... 725/112 |

FOREIGN PATENT DOCUMENTS

WO  WO 01/26369  4/2001

OTHER PUBLICATIONS

Steinhorn et al., How to Enhance TV with ATVEF, Miller Freeman, Inc., 1999, pp. 1-8.*
Vijay, Computer Hardware and Software, Jan. 19, 1998, p. 4.*
Advanced Television Enhancement Forum Specification (ATVF), Version 1.1 revision 26, (Feb. 2, 1999).
Estipona, Jim B., Announcing the Availability of an Electronic Programming Guide to Receivers of Enhanced Television Transmissions, U.S. Appl. No. 09/652,695, filed Aug. 31, 2000.

(Continued)

Primary Examiner—Jason Salce
(74) Attorney, Agent, or Firm—Trop, Pruner & Hu, P.C.

(57) ABSTRACT

Enhanced television broadcasts including triggers with expires attributes may be utilized in a variety of situations where the expires attribute may adversely affect the utilization of the trigger. For example, in situations where the broadcast is recorded, playback may be enabled even after the trigger expiration. Similarly, local affiliates or FNOCs may rebroadcast enhanced television content by adjusting the expires attributes of the original trigger.

30 Claims, 8 Drawing Sheets

OTHER PUBLICATIONS

Estipona, Jim B., "Mapping Enhancements to Network Identifiers", U.S. Appl. No. 09/652,692, filed Aug. 31, 2000.

Advanced Television Enhancement Forum (ATVEF), Enhanced Content Specification, Version 1.1, Revision 26, 1998-1999.

Web pages downloaded from http://www.replaytv.com, "What is Replay TV?", 1998-2000.

Web pages downloaded from http://tivo.com, "What is TiVo?", 2000.

* cited by examiner

TIME SHIFTING ENHANCED TELEVISION TRIGGERS

BACKGROUND

This invention relates generally to enhanced television broadcasts including analog and digital broadcasts.

Enhanced television programming enables television programming, in analog or digital form, to be accompanied by additional content. In some embodiments, the additional content may be in the form of Internet-based content. With enhanced television technology, content creators (e.g., broadcasters) may transmit hypertext markup language (HTML) data along with the traditional television signals. Viewers may interact with the television broadcast via the Internet.

For example, enhanced features may be displayed on a television screen that enable the viewer to access the network's web site for related programming information. The related programming information may be additional advertising or additional details that are not readily incorporated into the television program itself, as examples. Thus, the user may selectively access additional information through an Internet connection.

A variety of standards exist for enhanced television broadcasts including the Advanced Television Enhancement Forum's (ATVEF) Enhanced Content Specification, Version 1.1, Revision 26, 1998-1999 (hereinafter referred to as the ATVEF specification). The ATVEF specification provides standards for the transmission and processing of triggers, resources and announcements together with television content to produce a digital or analog enhanced television transmission.

In order to announce the availability of interactive television resources, a trigger may be utilized. Announcements announce programming currently available to the receiver. A resource is a television enhancement or web content displayable in conjunction with a television broadcast as an enhanced or interactive program.

According to the ATVEF specification, there are two basic transport types, called transport type A and transport type B. In transport type A, the resource is accessed over the Internet and in transport type B, the resource is transmitted with the television content.

Triggers may include a Uniform Resource Locator and may optionally also include a human readable name, an expiration date and a script. Triggers that include a name attribute may be utilized to initiate enhancements either automatically or with user confirmation. The initial top-level page for an enhancement is indicated by a Uniform Resource Locator in the trigger. The script attribute provides a script fragment to execute within the context of the page containing a trigger receiver object.

The expires attribute provides a expiration time, after which the link is no longer valid. The expires attribute may be in the form [expires: 19971223] according to one example provided in the ATVEF specification.

In some cases, the link to the resource provided by the trigger may be caused to expire after a period of time. This may create problems. For example, in some situations, the enhanced television content may be retransmitted by a local affiliate or so-called franchise network operating center (FNOC). The FNOC may receive the broadcast and then retransmit it at an appropriate time, for example given the FNOC's local time zone. As a result, the expiration time may come and go before the broadcast is ever even transmitted. In such case, a user may be unable to activate the link to obtain the resource.

Similarly, digital recording technology may be available to enable the user to actually record an enhanced broadcast. The user may subsequently attempt to replay the recorded broadcast and may be unable to activate the links to the resource because the links have expired.

Thus, there is a need to enable time shifted enhanced television content to be used effectively in a variety of circumstances.

DETAILED DESCRIPTION

Figure 1:
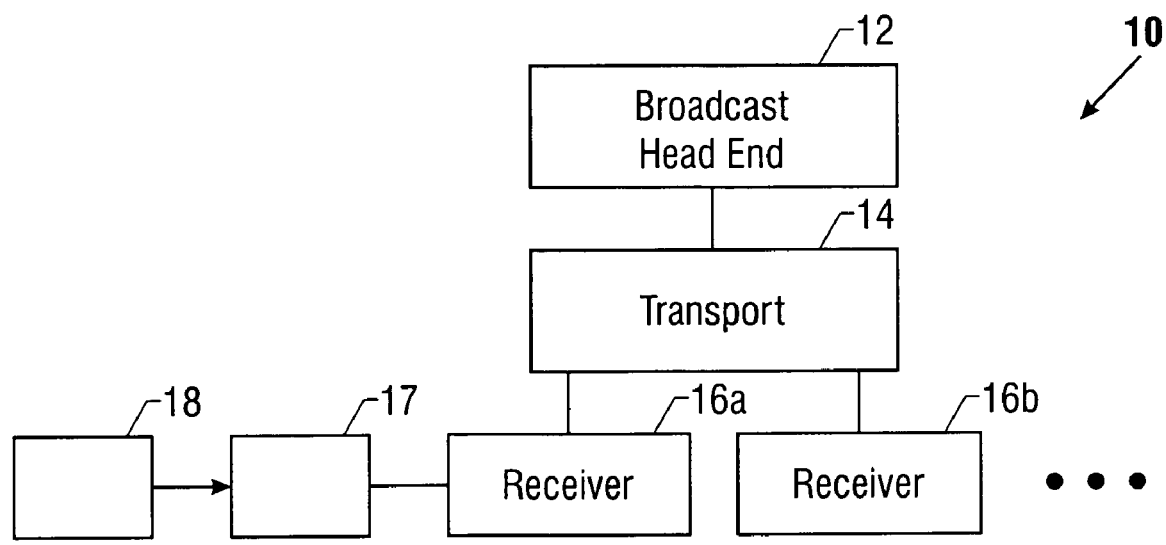
FIG. 1 is a schematic depiction of one embodiment of the present invention.

Referring to FIG. 1, an enhanced television delivery system 10 may include a broadcast head end or server 12. The head end or server 12 may provide the television content such as a television program and the enhanced content or at least a reference to the enhanced content. The enhanced television broadcast is transmitted from the head end 12 to a plurality of receivers 16 (although only the receivers 16a and 16b are shown in FIG. 1). The enhanced content may be transported over a transport 14 which may be a cable, a satellite connection or a conventional television broadcast. The enhanced content may be in analog or digital format.

Each receiver 16 may include a storage 17 that stores software 18. The receiver 16 may be a processor-based system. As examples, the receiver 16 may be a desktop computer, a laptop computer, a handheld computer, a set-top box or other processor-based appliance with a suitable connection to receive the enhanced content over a transport. The software 18 enables the enhanced content to be time shifted despite the presence of triggers with expiration times.

Figure 2:
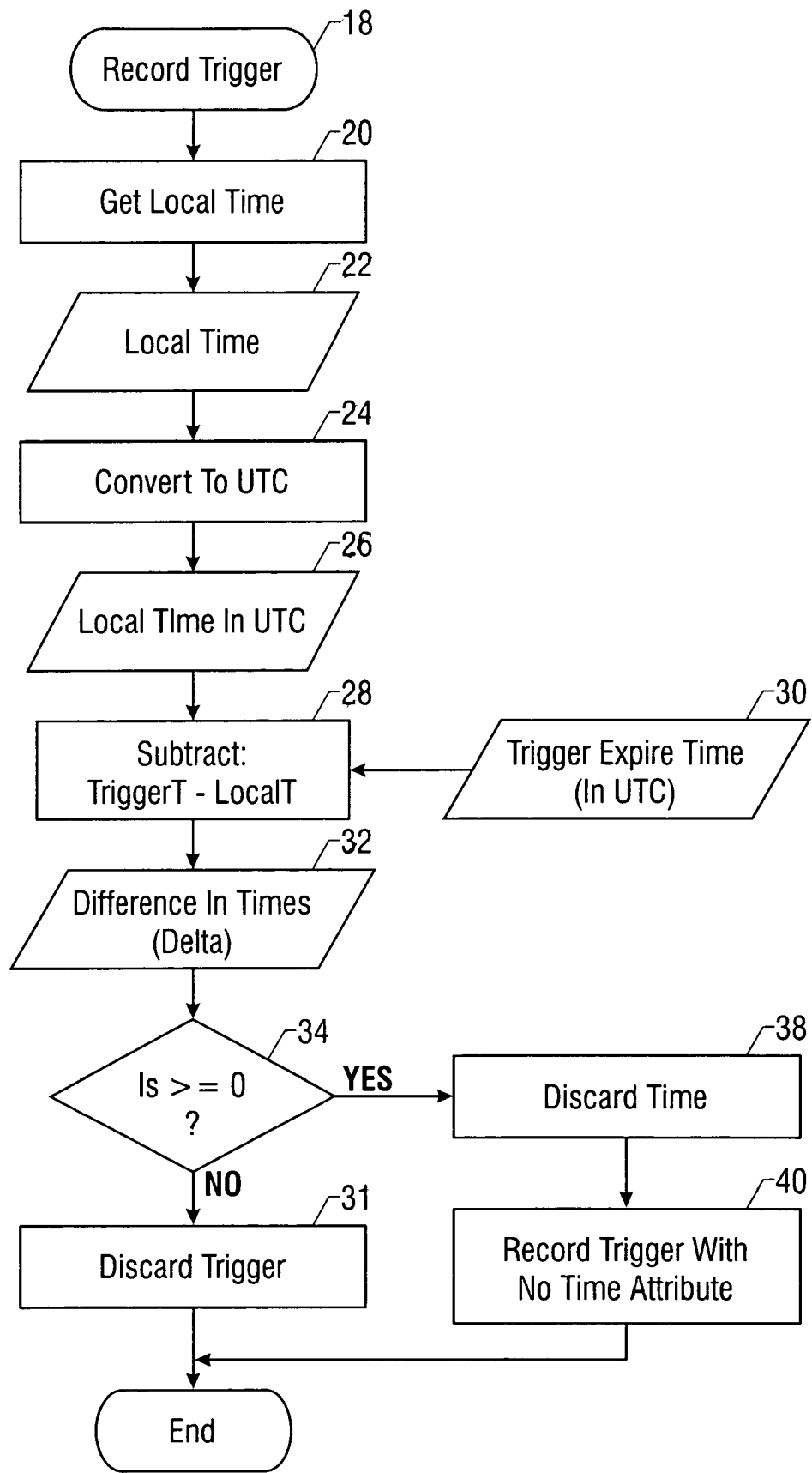
FIG. 2 is a flow chart for software in accordance with the embodiment shown in FIG. 1.

Referring to FIG. 2, the software 18 handles the situation where a receiver 16 is utilized to digitally record an enhanced television broadcast. The user may record not only the programming, but also the accompanying triggers. A trigger may be in the form of a Uniform Resource Locator (URL) used to access enhanced content over the Internet or may be a reference to a local storage location of a referenced resource.

Of course, if the trigger has an expiration time, the user may attempt to access the resource via the trigger long after the trigger has expired. In such case, the user may be unable to access the trigger even in the situation where the resource is actually still accessible.

Referring to FIG. 2, the software 18 initially obtains the local time as indicated in block 20. The local time may be stored as indicated in block 22. The local time may then be converted into Universal Coordinated Time (UTC), as indicated in block 24, and stored as indicated at 26.

The trigger expiration time may be extracted from the video stream as indicated at 30. The current local time (LocalT) is then subtracted from the trigger expiration time as indicated in block 28. The result is a delta time as indicated at 32. If the delta time is negative, the trigger has already expired and it may simply be discarded as indicated in block 31.

Otherwise, as determined in diamond 34, if the delta time is zero or positive, the expires attribute may be discarded as indicated in block 38. The trigger may then be recorded with the other enhanced television content without a expires attribute. In effect then, a trigger with an expires attribute is converted into a format in which the expires attribute is removed. The absence of an expires attribute is permissible under the ATVEF specification.

The resulting trigger is then capable of being exercised at any time. If the resource is stored locally (i.e. via a Type B transport), that resource can then be acquired anytime the trigger is selected. If the resource is accessed externally (i.e. via a Type A transport), the resource may not always be active. In such case, the trigger may not be capable of accessing the remote resource.

However, if desired, the remotely accessible resource may be accessed upon acquisition of the trigger and the resource may thereafter be stored locally for subsequent local access. Alternatively, the trigger's Uniform Resource Locator may be modified to a local storage address to access the locally stored resource.

Figure 5:
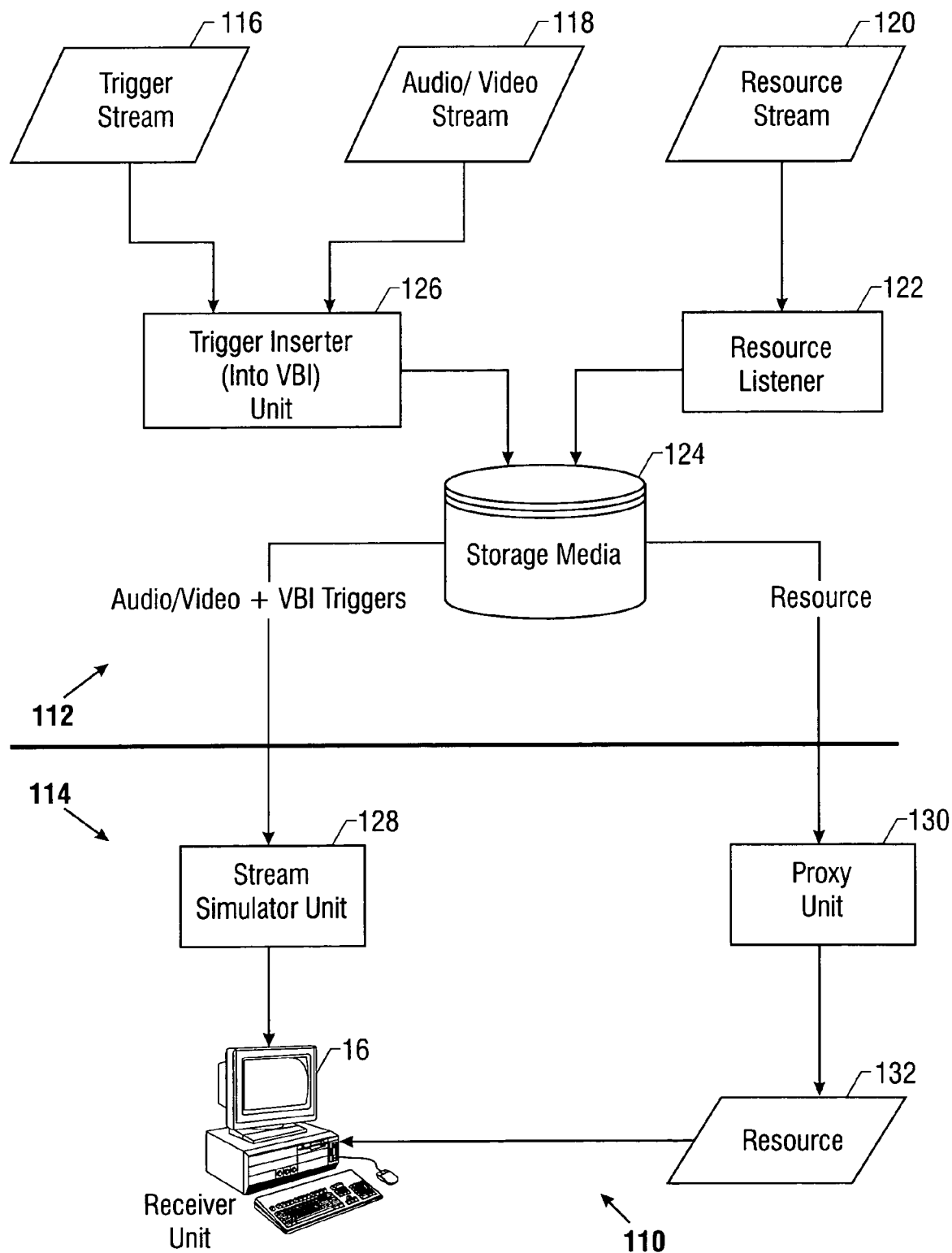
FIG. 5 is a functional block diagram illustrating an embodiment of the invention.

Referring to FIG. 5, a system 110, in accordance with one embodiment for recording analog enhanced television broadcasts includes a recording component or "recorder" 112, and a playback component or "player" 114. According to one embodiment of the invention, the recorder 112 stores Transport Type B streams (and can also store Transport Type A streams), while the player 114 can transform and play the stored streams as Transport Type A streams.

An enhanced television Transport Type B transmission includes a trigger stream 116, an audio/video stream 118, a resource stream 120, and an announcement stream (not shown). The audio/video stream 118 may be a National Television Standards Committee (NTSC) signal. In operation, announcements are sent before or during a television program to a well-known Internet Protocol (IP) address and port number to announce the availability of enhancements. A receiver tunes in to this IP address/port and receives information about how to receive trigger and resource information, where the trigger typically includes a URL that points to a location of the resource.

If resources in the resource stream 120 are extracted by a resource listener 122, such resources are typically stored in a storage media 124, which may be a cache, for example. The storage media 124 may also be a hard disk, floppy disk, digital versatile disk, random access memory (RAM), compact disk, or other suitable machine-readable storage medium. The resource listener 122 may be programmed to reject duplicate or outdated resources, such that only the appropriate resources are stored in the storage media 124.

When the resources are stored in the storage media 124, the trigger(s) corresponding to those stored resources typically include a local identifier URL (e.g., a lid: URL), meaning that the resources were delivered using a one-way broadcast and are not available on-demand. As such, Transport Type B is used for a true broadcast of both resource data and triggers and can run without an Internet connection. An optional Internet connection can provide a return path if the triggers point (e.g., by using http: or ftp: URLs) to resources that are available on the Internet (e.g., for e-commerce or web browsing).

Transport Type A involves the delivery of triggers along with the audio/visual stream 118. That is, existing Transport Type A transmissions often transmit triggers on the vertical blanking interval (VBI) of the NTSC video signal. Transport Type A transmissions may not transmit a resource stream 120 or an announcement stream. Hence, Transport Type A systems usually use two-way Internet connections to fetch resources using http:.

The system 110 includes a trigger inserter unit 126 for the recorder 112, and a stream simulator unit 128 (which can be likened to a Transport Type A stream simulator) and a proxy unit 130 for the player 114. The end result is that one or more resources 132 may be provided to a receiver unit 16, from the storage media 124, without having to unnecessarily retrieve the resources 132 from the Internet. Furthermore, using the trigger inserter unit 126 to insert triggers into the video signals (e.g. into the VBI) of the audio/video stream 118 provides synchronization between the trigger stream 116 and the audio/video stream 118 that is not present in conventional Transport Type B systems.

Figure 6:
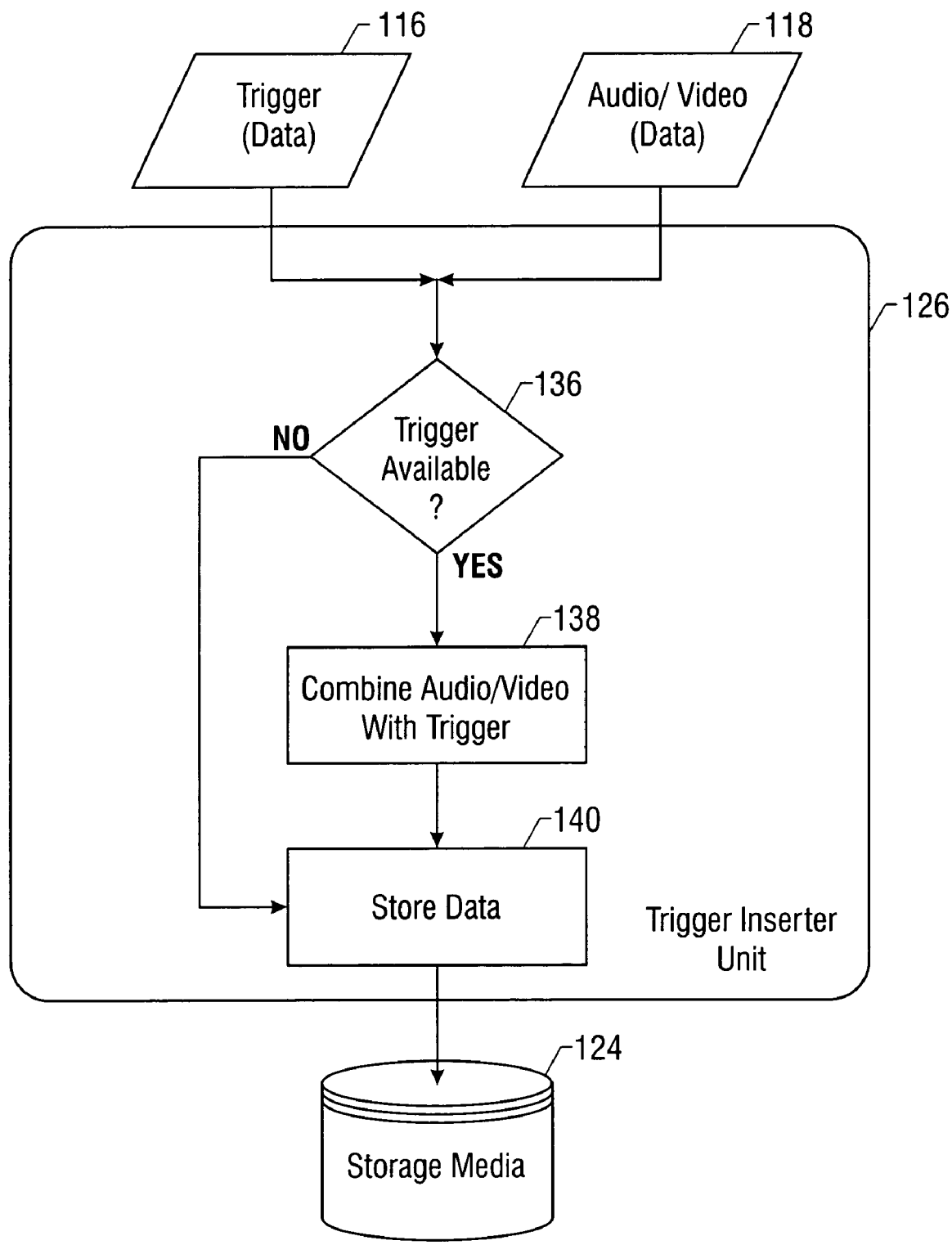
FIG. 6 is a flow diagram showing operation of an illustrative type of trigger inserter unit that can be used with the embodiment shown in FIG. 5.

Operation of an embodiment of the trigger inserter unit 126 of the recorder 112 is illustrated in a flow diagram in FIG. 6. The trigger inserter unit 126 can be embodied in software, hardware, or a combination of both, and uses data from the trigger stream 116 and data from the audio/video stream 118 as inputs.

At a block 136, the trigger inserter unit 126 first determines if there is a trigger available in the received broadcast. If the received broadcast is a Transport Type A transmission, such triggers, if any, may be in the VBI of the audio/video stream 118 for examples. The triggers are extracted and evaluated for validity as part of the receiving process. If the triggers are valid, the trigger inserter unit 126 stores the data from the audio/video stream 118 (and its associated valid triggers) into the storage media 124 at block 140.

If a Transport Type B transmission is present, then the trigger inserter unit 126 detects the availability of valid triggers from the trigger stream 116 at block 136. At block 138, the trigger inserter unit 126 combines the trigger data with the audio/visual data. More specifically, according to an embodiment of the invention, the trigger inserter unit 126 inserts triggers into the VBI of the audio/visual stream 118. In this manner, the Transport Type B stream is "transformed" into Transport Type A stream prior to storage into the storage medium 124 at the block 140. Accordingly, by inserting the triggers into the VBI, as the trigger stream 116 and the audio/visual stream 118 are received, the triggers are synchronized in time with the audio/visual data by presenting the triggers along with their corresponding video frames.

At block 140, the trigger inserter unit 126 stores the data into the storage media 124 using a suitable type of audio/video streaming and storage format. Formats such as RealVideo™/RealAudio™, Flash™, QuickTime™, Audio Video Interleaved (AVI), Motion Pictures Experts Group (MPEG), DVD, etc. may be used.

The trigger may include URLs pointing to locations of resources. These URLs may be in the form of lid: URLs pointing to the storage media 124 if the corresponding resources were extracted from the resource listener 122 and subsequently stored in the storage media 124. The URLs in the trigger may also be http: URLs if the corresponding resource is available both from the storage medium 124 and from the Internet. Similarly, other URL schemes, such as ftp:, may be used by the triggers to denote the location of resources available from the storage media 124 or from the Internet.

In one embodiment, the resource listener 122 extracts resources from the resource stream 120, regardless of its specific URL, and then stores these resources in the storage media 124. The manner of retrieving stored resources from the storage media 124, rather than from an external Internet source, is described in further detail below with respect to the proxy unit 130.

Figure 7:
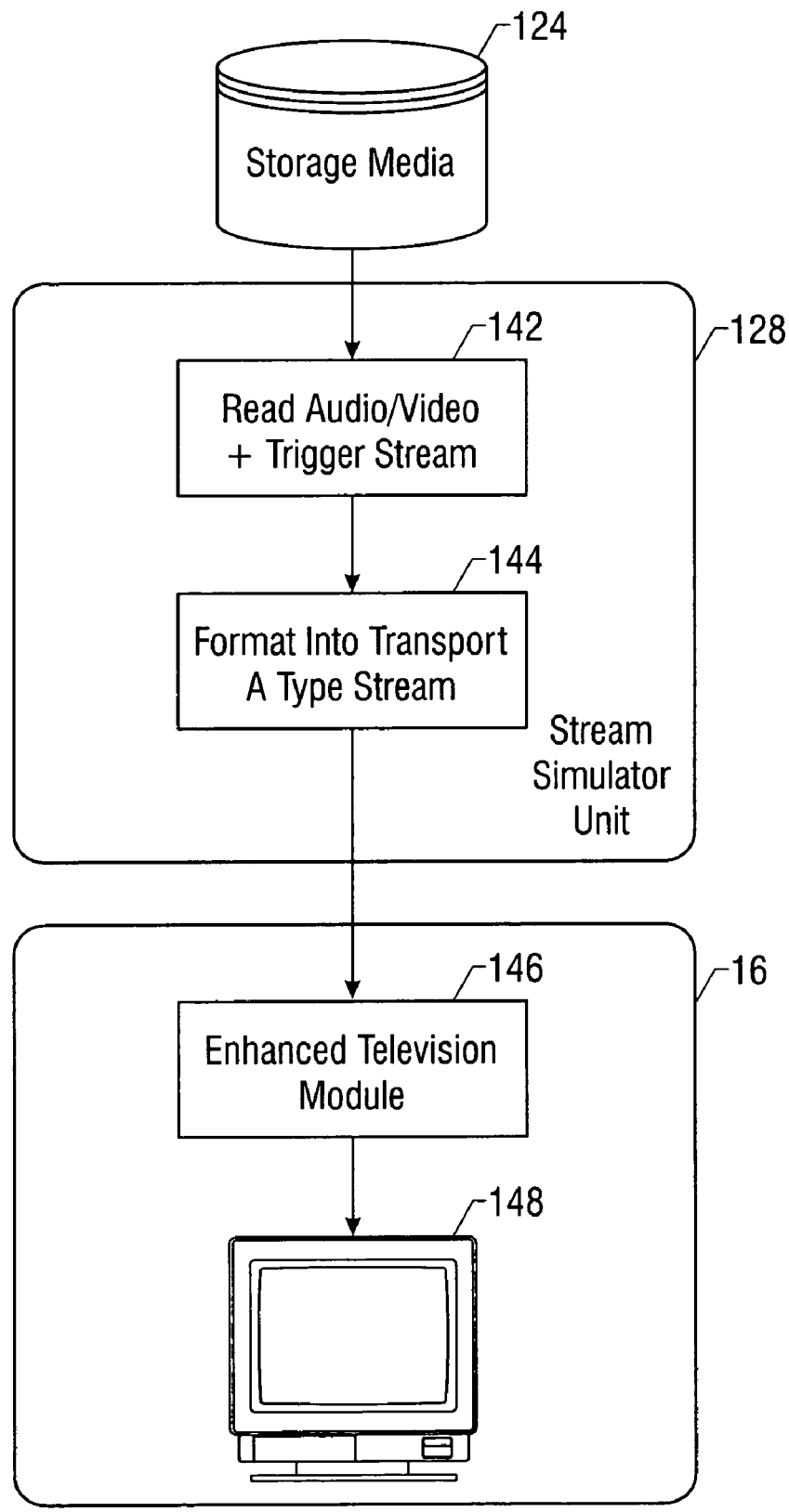
FIG. 7 is a flow diagram showing operation of an illustrative type of stream simulator unit that can be used with the embodiment shown in FIG. 5.

FIG. 7 shows an embodiment of the stream simulator unit 128 that can be used by the player 114. The stream simulator unit 128 may be embodied in software, hardware, or a combination of both. In operation, the stream simulator unit 128 reads, from the storage media 124, the stored audio/video stream 118 and the trigger stream 116 at a block 142. In some embodiments, the stream simulator unit 128 may format the resulting stream at a block 144, in order to make the resulting stream compatible with the format used by the applicable presentation/display application software. For example, if Microsoft Window's DirectShow™ is used as the presentation software, then the stream simulator unit 128, at the block 144, can format the resulting stream into the DirectShow™ architecture using libraries in the Windows environment.

Next, the stream simulator unit 128 provides the simulated Transport Type A stream to the receiver 16. As an example, the receiver 16 may comprise a conventional television set as the display unit 148 and having the enhanced television module 146 as a separate unit coupled to the television set. The enhanced television module 146 may have the capability to receive enhanced television broadcast data, display/announce the enhanced television features to the user, and then provide the user with interfaces to allow the user to input information (e.g., to interact) with the enhanced broadcast.

Figure 8:
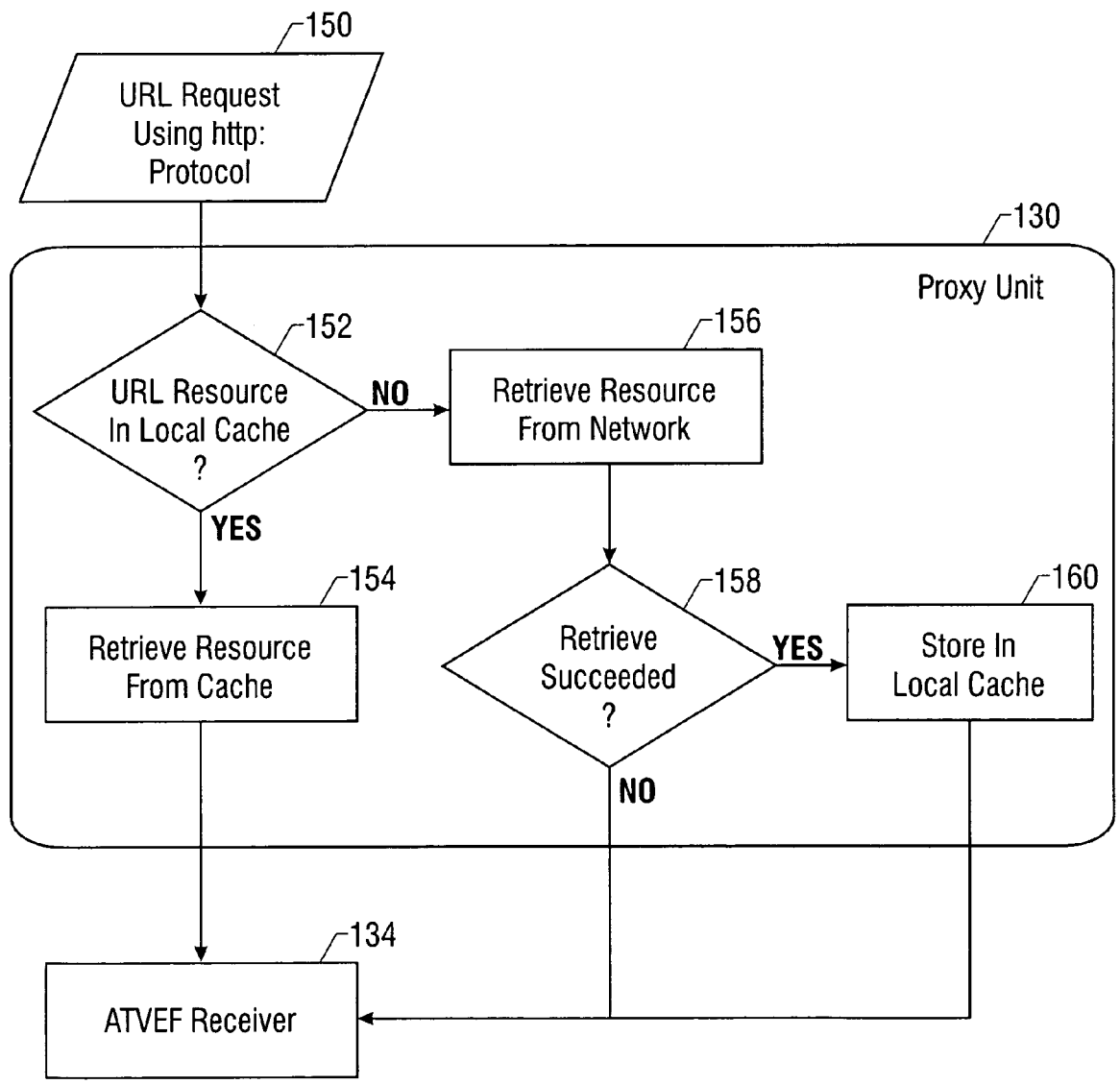
FIG. 8 is a flow diagram showing operation of an illustrative type of proxy that can be used with the embodiment shown in FIG. 5.

Operation of the player 114 using the receiver 16, the stream simulator unit 128, and the proxy unit 130 is shown in FIG. 8 in accordance with one embodiment of the invention. The proxy unit 130 may be thought of as an "http: proxy" in that it intervenes in the retrieval of resources 132 having http: URLs. The proxy unit 130 can also be made to intervene and retrieve resources 132 having lid: URLs or other protocol resources, such as a resource having an ftp: URL. That is, the proxy unit 130, in one embodiment, may comprise a thin/simple agent that can reroute a resource request and retrieve the requested resource from a local cache (e.g., from the storage media 124) if available, but relinquishes or invokes a normal http: handler to perform the retrieval if the requested resource is not in the local cache (and assuming that an uplink or back channel to the Internet is available).

The proxy unit 130 may be embodied in software, hardware, or a combination of both. In one embodiment, the proxy unit 130 can comprise a set of software communication instructions or settings in a registry of an operating system of a PC, for example.

In one example, when the receiver 16 receives an enhanced television broadcast, in a simulated Transport Type A stream format having triggers inserted in the VBI, the user can request the resources 132 or the receiver 16 can automatically request the resources 132. If the receiver 16 is Transport Type A-enabled, the requested resources 132 are retrieved externally from the Internet. Therefore, at a block 150 in FIG. 8, the receiver 16 sends a URL request for the resource 132 using http: protocols. If the trigger included a lid: URL, rather than an http: URL, then the receiver 16 and/or proxy unit 130 can retrieve the resource 132 directly from the storage media 124, which may be a local cache.

At diamond 152, the proxy unit 130 intercepts the http: request from the receiver unit 134 and determines if the resource 132 is in the storage media 124. If it finds the resource 132 in the storage media 124, then the resource 132 is retrieved from the storage media 124, as indicated at block 154, and is provided to the receiver 16 for display and/or other use by the receiver 16. As indicated at diamond 152, the proxy unit 130 may retrieve resources 132 having lid: URLs from the storage media 124, as well as resources 132 having http: or ftp: URLs from the storage media 124, if the resources 32 are stored there, or externally from the Internet.

If the proxy unit 130 does not find the requested resource 132 in the storage media 124, then at a block 156, the proxy unit 134 may attempt to retrieve the resource 132 from the network (e.g., from the Internet). If the retrieval is unsuccessful as determined at 158, then a failure message is sent to the receiver 16. In response, the receiver 16 may cause the proxy unit 130 to try again, or the receiver 16 may display a message to the user on the display unit 148 to notify the user of the unavailability of the resource 132 or other appropriate response.

If the resource 132 is successfully retrieved by the proxy unit 130, then the retrieved resource 132 can be stored in the storage media 124, as indicated at block 160, and then subsequently provided to the receiver 16, thereby providing the user with enhanced television content and features.

Embodiments of the invention may transform Transport Type B streams into a simulated Transport Type A stream by inserting triggers into the video stream. The recorder 112 stores resources and the transformed stream in the storage media 124. During playback, the player 114 may read the triggers in the stored simulated Transport Type A stream from the storage media 124 and use the proxy unit 130 to retrieve requested resources from the storage media 124 or externally from the Internet, if the resource is not already stored. As such, Transport Type B transmissions appear like and are treated like Transport Type A transmissions by the receiver unit 134.

Figure 3:
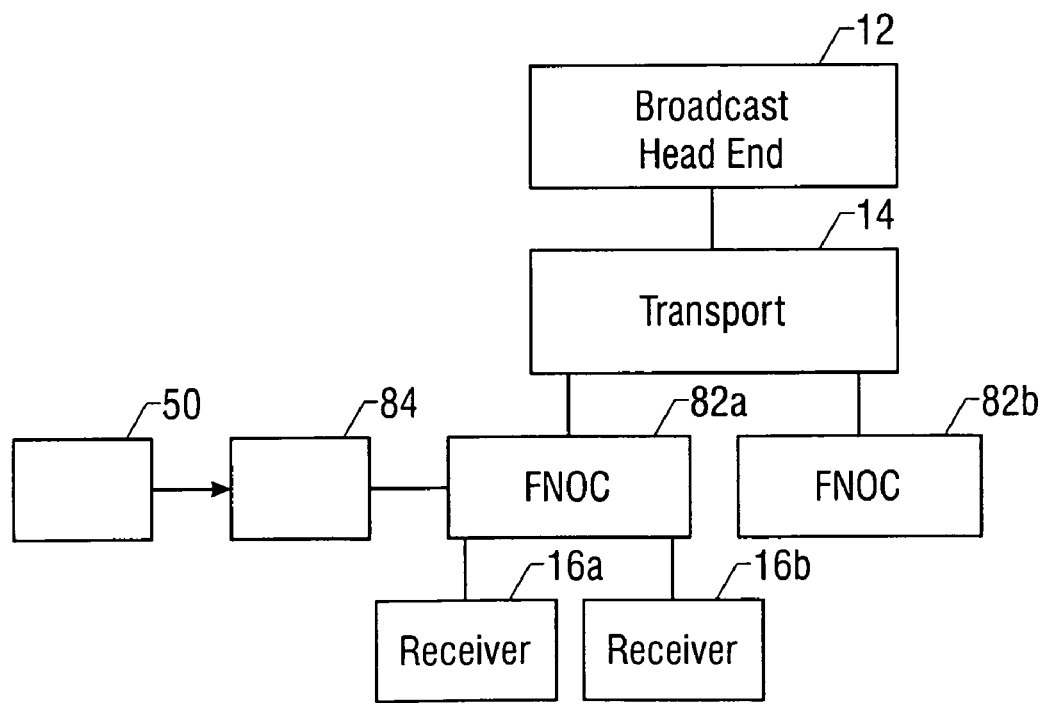
FIG. 3 is a schematic depiction of another embodiment of the present invention.

Referring next to FIG. 3, an embodiment with a regional affiliate or FNOC 82 includes a broadcast head end 12 and transport 14 as described previously. The FNOCs 82*a* and 82*b* receive the enhanced television programming over the transport 14 and then provide the programming to local receivers 16. The local receivers 16*a* and 16*b* may receive the broadcast over still another transport (not shown).

Each FNOC 82 may include a storage 84 that stores software 50. The FNOCs 82 may include a processor-based system that is capable of executing the software 50 stored on the storage 84.

If the FNOC rebroadcasts the enhanced broadcast at a later time than was originally intended, an issue arises with respect to trigger expiration. For example programming originating in one time zone may be provided to a FNOC 82 in another time zone. The FNOC 82 may determine that it is most appropriate to time shift the programming to an appropriate local time zone, time slot for rebroadcast. However, in some cases, the triggers may be expired by the time the material is actually retransmitted.

Figure 4:
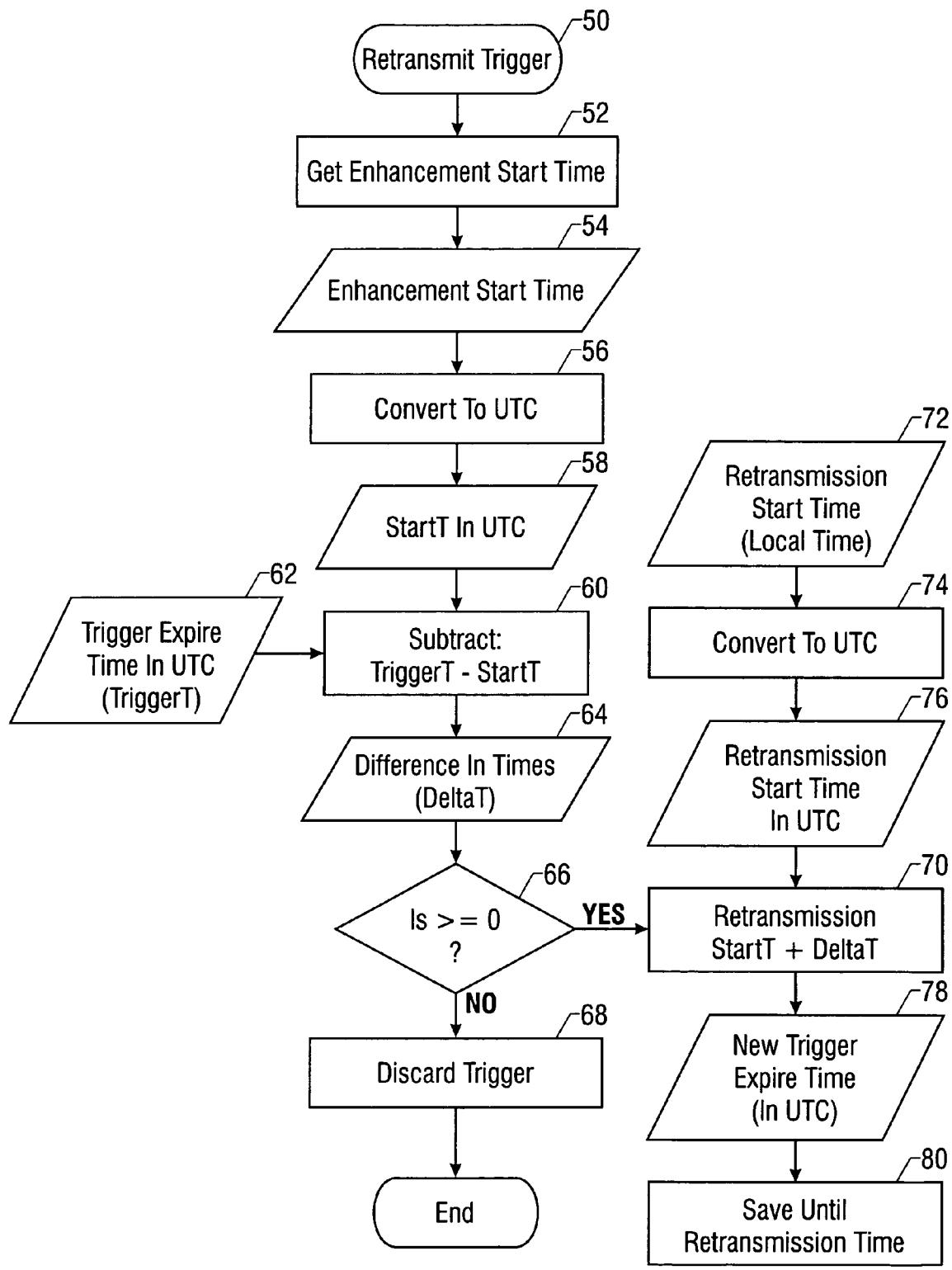
FIG. 4 is a flow chart for software utilized in accordance with the embodiment shown in FIG. 3.

The software 50 accounts for this potential transmission time shifting by the FNOC and adjusts the expires attribute accordingly. Referring to FIG. 4, the software 50 begins by obtaining the FNOC's enhancement start time or the scheduled time for the program to start (StartT) as indicated in block 52. The enhancement start time indicated in block 54, is converted to UTC at 56 and as indicated at 58.

The trigger expire time (TriggerT) is extracted from the enhanced television stream as indicated at 62. The enhancement start time (StartT) is then subtracted from the trigger expire time (TriggerT) as indicated in block 60. This results in a delta time (DeltaT) as indicated at 64.

A check at diamond 66 determines whether the delta time is greater than or equal to zero. If not, the trigger is discarded as indicated in block 68.

Otherwise, a retransmission time equal to the retransmission start time plus the delta time is utilized (block 70) as the new expires attribute in the trigger. The retransmission start time or time that the FNOC will rebroadcast the enhanced programming in local time is acquired as indicated at 72, converted to UTC as indicated in block 74 and stored as a retransmission start time as indicated at 76. Thus, the retransmission start time as determined by the FNOC is then added to the delta time at block 70, to create a new trigger expires attribute as indicated at 78. This attribute is saved as indicated at block 80.

As a result, the expiration time may be executed as originally intended at the head end. That is, the expiration time may be extended in accordance with local time to a predetermined amount of time after the initial broadcast. This effectuates the original intent of the expires attribute in the original enhanced television broadcast.

In the case of rebroadcasting data received via a Type B transport, the resource may be locally accessible and the handling of the triggers may be in accordance with the above description. However, in the case where the FNOC receives a Type A transport, simply adjusting the expires attribute without more may result in the situation where the resources may not be accessible because the web site addressed through the trigger may no longer be operable.

This problem may be handled in at least two different ways. Under one approach, the FNOC may automatically access the web site through the trigger's URL and download the content therein. The FNOC may then transmit the resource with the other enhanced content via a Type B transport. Alternatively, the FNOC may translate the trigger's URL to a mirror web site maintained by the FNOC. That is, the FNOC may acquire the content via the URL referenced by the trigger, and copy it over to the FNOC's own web site. The FNOC may then automatically translate the URL in the trigger to a new URL to enable access to the FNOC controlled web site. In this way, the FNOC can control the availability of the resource while maintaining a type A transport.

Figure 9:
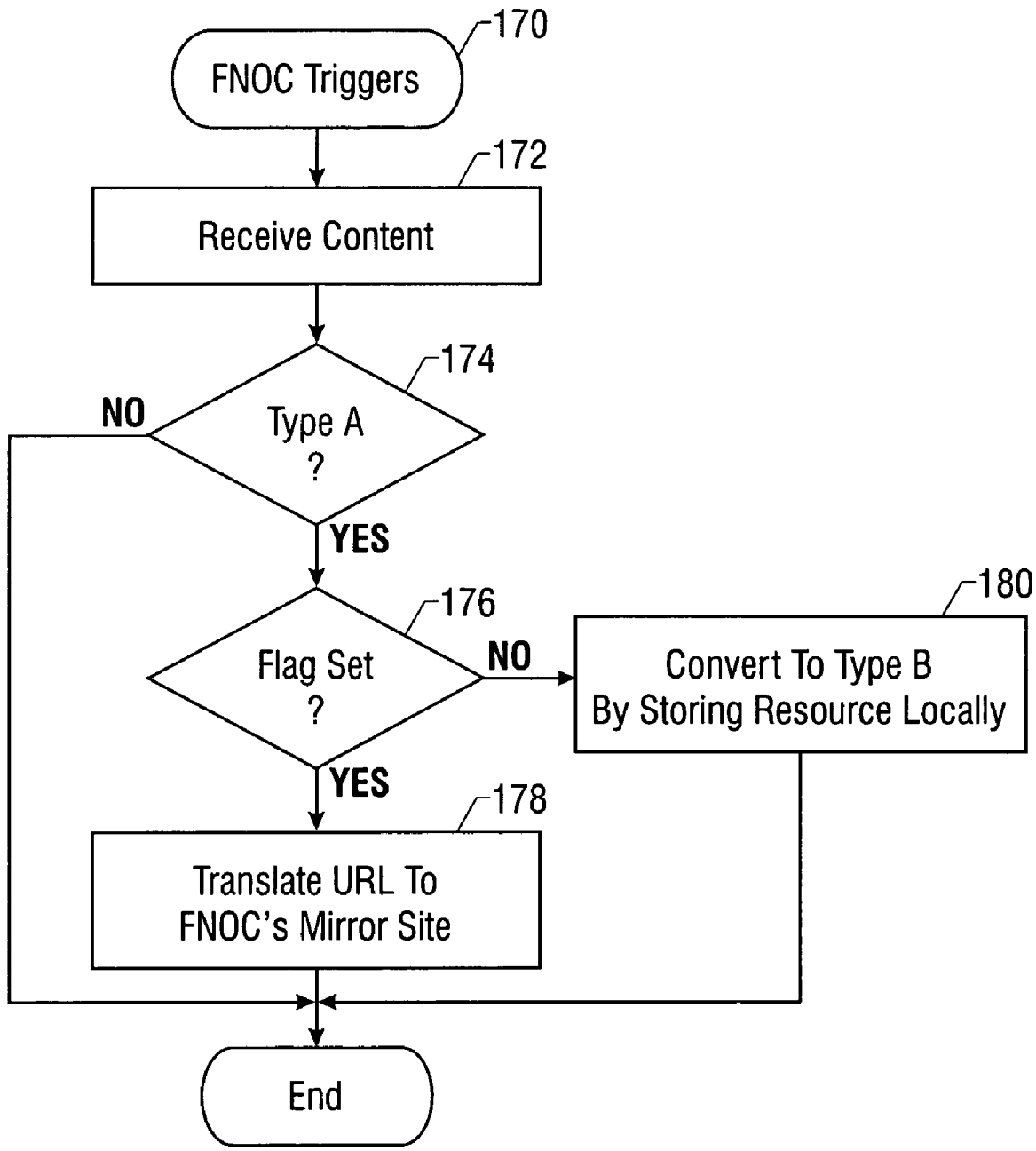
FIG. 9 is a flow chart for software in accordance with another embodiment of the present invention.

Referring to FIG. 9, software 170 may be stored and utilized in conjunction with the software 50. Initially, the content is received over the transport as indicated in block 172. A check at diamond 174 determines whether the content is in the type A transport format. If not, the flow ends, and the triggers can be handled readily.

Conversely, if a type A transport is utilized, a check at diamond 176 determines whether a flag is set. In one embodiment of the present invention, the FNOC can set or unset a flag to select whether to convert the type A transport to a type B transport with a locally stored resource or to simply transition the data from the broadcaster's web site to the FNOC's web site. Thus, the FNOC can decide whether to use its own web site or to access the data from the broadcaster's web site and to transmit the data to the receiver 16.

If the flag is not set, the data may be converted to a type B transport, storing the accessed resource locally as indicated in block 180. That is, the FNOC accesses the resource from the broadcaster's web site, and then transmits the resource with the other content to the receiver 16. Conversely, if the flag is set, the FNOC translates the broadcaster's URL to point to the FNOC's mirror site as indicated in block 178.

In some embodiments of the present invention, time shifted transmissions or playback of enhanced television content may be accommodated despite the use of expires attributes in associated triggers. In this way, the expires attribute may be utilized but the system may not become unduly burdened by the expires attribute.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an enhanced television transmission including a trigger that points to a resource and has an expires attribute indicating a trigger expiration time that prevents accessing said trigger after an expiration time; and
   enabling the resource to be accessed after the trigger expiration time.

2. The method of claim 1 including rebroadcasting the enhanced television transmission.

3. The method of claim 1 including differencing the current time and the trigger expiration time.

4. The method of claim 3 including determining whether the trigger expiration time is greater than the current time and if not, discarding the trigger.

5. The method of claim 2 including determining whether the trigger expiration time is greater than the enhancement start time and if so, retransmitting the trigger with a trigger expiration time equal to the time when an enhanced television transmission will be rebroadcast plus the difference between the trigger time and the enhancement start time.

6. The method of claim 1 including recording said enhanced television, transmission for subsequent replay.

7. The method of claim 6 including differencing the current time and the trigger expiration time.

8. The method of claim 7 including determining whether the difference is greater than zero.

9. The method of claim 8 wherein, if the difference is not greater than zero, discarding the trigger before recording said enhanced television transmission.

10. The method of claim 8 including, if the difference is greater than zero, discarding the trigger expiration time and recording the trigger.

11. The method of claim 1 including receiving an enhanced television transmission having a trigger that refers to a remote resource, accessing said remote resource and storing said remote resource.

12. A computer readable medium encoded with a computer program to enable a processor-based system to:
   receive an enhanced television transmission including a trigger that points to a resource and has an expires attribute indicating a trigger expiration time that prevents accessing said trigger after an expiration time; and enable the resource to be accessed and displayed after the trigger expiration time.

13. The medium of claim 12 further storing instructions that enable the processor-based system to rebroadcast the enhanced television transmission.

14. The medium of claim 12 further storing instructions that enable the processor-based system to subtract the current time from the trigger expiration time.

15. The medium of claim 14 further storing instructions that enable the processor-based system to determine whether the trigger expiration time is greater than the current time and if not, discard the trigger.

16. The medium of claim 12 further storing instructions that enable the processor-based system to determine whether the trigger expiration time is greater than the enhancement start time and if so, retransmit the trigger with a trigger expiration time equal to the time when the enhanced television will be rebroadcast plus the difference between the trigger time and the enhancement start time.

17. The medium of claim 12 further storing instructions that enable the processor-based system to record said enhanced television transmission for subsequent replay including both the television content and an enhancement accompanying said television content.

18. The medium of claim 17 further storing instructions that enable the processor-based system to difference the current time and the trigger expiration time.

19. The medium of claim 18 further storing instructions that enable the processor-based system to determine whether the difference is greater than zero.

20. The medium of claim 19 further storing instructions that enable the processor-based system to discard the trigger before recording said enhanced television transmission if the difference is not greater than zero.

21. The medium of claim 19 further storing instructions that enable the processor-based system to discard the trigger expiration time and record the trigger if the difference is greater than zero.

22. The medium of claim 12 further storing instructions that enable the processor-based system to receive an enhanced television transmission having a trigger that refers to a remote resource, access said remote resource and store said remote resource.

23. A system comprising:

a processor-based device; and a storage coupled to said processor-based device storing instructions that enable said processor-based device to receive an enhanced television transmission including a trigger that points to a resource and has an expires attribute indicating a trigger expiration time that prevents accessing said trigger after an expiration time and enable the resource to be accessed after the trigger expiration time.

24. The system of claim 23 wherein said system is an enhanced television receiver with a broadcast recording device.

25. The system of claim 23 wherein said system is an enhanced television rebroadcast system.

26. The system of claim 25 wherein said storage stores instructions that difference the trigger expiration time and the enhancement start time.

27. The system of claim 26 wherein the trigger is discarded if the trigger has expired.

28. The system of claim 23 wherein said storage stores instructions that enable said system to receive enhanced television transmission having a trigger that refers to a remote resource, access said remote resource and store said remote resource.

29. The system of claim 28 wherein said storage stores instructions that enable said system to convert a type A transmission to a type B transmission.

30. The system of claim 28 wherein said system makes said resource available at a new location and translates said trigger to point to said new location.

* * * * *